United States Patent [19]
Säufferer

[11] 3,892,483
[45] July 1, 1975

[54] DISTANCE WARNING DEVICE FOR VEHICLES

[75] Inventor: Helmut Säufferer, Esslingen, Germany

[73] Assignee: Daimler-Benz Aktiengesellschaft, Germany

[22] Filed: Nov. 10, 1972

[21] Appl. No.: 305,318

[30] Foreign Application Priority Data
Nov. 11, 1971 Germany............ 2156001

[52] U.S. Cl............. 356/4; 356/28; 343/11.2 CA; 180/98; 340/33; 340/34
[51] Int. Cl. .................. G01c 3/08; G08g 1/00
[58] Field of Search........... 356/4, 5, 28; 343/7 PF, 343/112 CA; 180/98; 340/33, 34

[56] References Cited
UNITED STATES PATENTS

| | | |
|---|---|---|
| 2,188,293 | 1/1940 | Williams............ 180/98 |
| 2,851,120 | 9/1958 | Fogiel............... 180/98 |
| 2,896,089 | 7/1959 | Wesch.............. 343/112 CA |
| 3,152,317 | 10/1964 | Mayer.............. 180/98 |
| 3,394,342 | 7/1968 | Walker............. 343/112 CA |
| 3,533,061 | 10/1970 | Treiterer.......... 340/33 |

*Primary Examiner*—Maynard R. Wilbur
*Assistant Examiner*—S. C. Buczinski
*Attorney, Agent, or Firm*—Craig & Antonelli

[57] ABSTRACT

A distance warning installation for vehicles, especially for motor vehicles, in which each vehicle is equipped with one or two transmitters, radiating beams of light or other waves toward the rear, as well as with a forwardly directed receiver mounted at the vehicle front end for receiving the same types of waves; when the waves of the directional beam transmitted by the preceding vehicle are received by the receiver of the following vehicle, an acoustic and/or optical signal is produced by the receiver and/or a braking operation is automatically initiated thereby.

17 Claims, 8 Drawing Figures

DISTANCE WARNING DEVICE FOR VEHICLES

The present invention relates to a distance warning device for vehicles, especially for motor vehicles.

By reason of insufficiently small safety distances, one is confronted ever more frequently with rear-end collision accidents and in case of bumper-to-bumper traffic, with mass vehicle pile-ups.

The present invention is concerned with providing an installation, with the aid of which such traffic accidents can be avoided.

The underlying problems are solved according to the present invention in that each vehicle is equipped with at least one transmitter for light or other waves which radiate the light or the waves in a rearward direction, as well as with a forwardly directed receiver disposed at the front end of the vehicle for the same type of waves, and in that upon impingement of the directional beam emitted by the transmitter of the preceding vehicle on the receiver of the following vehicle, an acoustic and/or optical signal is triggered by the receiver and/or a braking operation is automatically initiated by the same.

One embodiment according to the present invention resides in that each vehicle is equipped with a transmitter secured at roof height which radiates a directional beam rearwardly with a predetermined inclination to the road surface, which beam is adapted to be received by a receiver of a following vehicle, mounted on the following vehicle at a predetermined height.

A further embodiment of the present invention is so constructed that each vehicle is equipped with two transmitters secured at roof height to the left and right, which radiate each a directional beam rearwardly with predetermined inclination both with respect to the road surface as also with respect to the vehicle longitudinal plane and thus at a predetermined distance to the rear of the vehicle an area of increased radiation intensity occurs which can be detected by a receiver of a trailing vehicle.

Both embodiments can be constituted considerably more effective according to the present invention if provision is made that the transmitter or transmitters are so constructed that the inclination of the directional beam to the road surface is changeable as a function of the vehicle velocity by conventional speed-responsive control means so that the receiver of a trailing vehicle can detect this directional beam of the preceding vehicle preceding at a lower velocity already at a larger distance than when the preceding vehicle travels at a higher velocity.

In the determination of the largest safety distance, one has to start from a predetermined vehicle maximum velocity of the trailing vehicle and standstill of the forwardly disposed vehicle.

A further embodiment according to the present invention resides in that the receiver installation is so constructed that it responds to a predetermined intensity change $dI/dt$, corresponding to the relative drive-in or on-coming velocity of the trailing vehicle into the radiation space of the preceding vehicle.

A further possibility according to the present invention resides in mounting the two transmitters and the receiver at the same height. With an inclination of the directional beams to the vehicle longitudinal center plane and parallel to the road surface plane, there results a defined or limited area of increased intensity with which a change of the angle of inclination to the vehicle longitudinal center plane, dependent on the vehicle velocity, lies at a larger or smaller distance from this vehicle and which is encountered by the receiver of a trailing faster-moving vehicle.

It is possible in all embodiments according to the present invention that the vehicle receiver installation is so constructed that it responds to a predetermined intensity of the received directional beam. It is also feasible within the scope of the present invention that the transmitter or transmitters are so constructed that for purposes of avoiding interference radiation it transmits or they transmit a directional beam with constant frequency or pulse number (repetition rate) and that the receiver is so constructed by conventional means that it responds only to the directional beams with this frequency or pulse frequency (repetition rate).

A further embodiment according to the present invention results from the fact the transmitter or transmitters are so constructed that it or they transmit a directional beam with a frequency dependent on the vehicle velocity or with a pulse number (repetition rate) dependent on the vehicle velocity and that the receiver is so constructed that it compares the frequency of a received directional beam with a frequency proportional to the velocity of its own vehicle and upon determination of certain comparison criteria produces an acoustic and/or optical signal and/or initiates a braking operation.

The transmitter or transmitters have to be so constructed that the directional beams transmitted by the same so expand, i.e., have such a radiation pattern that they are detectable also in road curves up to a predetermined minimum radius of curvature and with changes of the road surface inclination up to a predetermined change of angle of inclination of the receiver of a following vehicle.

In order to protect passing vehicles or vehicles driving along a side lane, in which no warning signal is to be triggered, against the directional beam, the receiver of each vehicle is provided with a directional shield or the like which is so constructed that only directional beams of a vehicle driving in front in the same lane can impinge on the receiver.

Accordingly, it is an object of the present invention to provide a distance warning device for vehicles, especially motor vehicles, which avoids by simple means the aforementioned shortcomings and drawbacks encountered in the prior art.

Another object of the present invention resides in a distance warning device for vehicles which effectively prevents rear end collisions and/or mass pile-ups due to inadequate spacings of the vehicles.

A further object of the present invention resides in a distance warning installation for motor vehicles which is simple in construction as well as reliable in operation.

Another object of the present invention resides in a warning system for vehicles, especially motor vehicles of the type described above which effectively eliminates undesired interference signals.

These and other objects, features, and advantages of the present invention will become more apparent from the following description when taken in connection with the accompanying drawing which shows, for purposes of illustration only, two embodiments in accordance with the present invention, and wherein.

Figure 1:
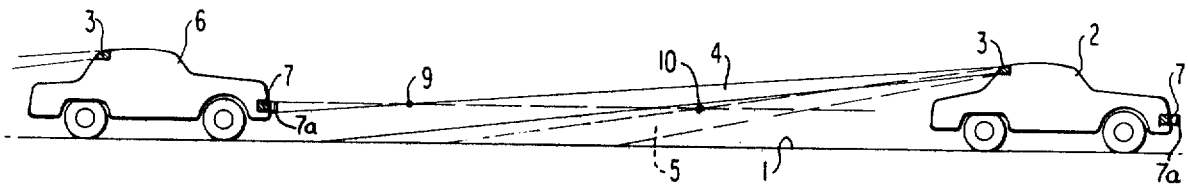
FIG. 1 is a schematic side view of one embodiment of a distance warning installation in accordance with the present invention with two transmitters having an angle of inclination of the directional beam adjustable with respect to the road surface in dependence on the vehicle velocity.
Figure 2:
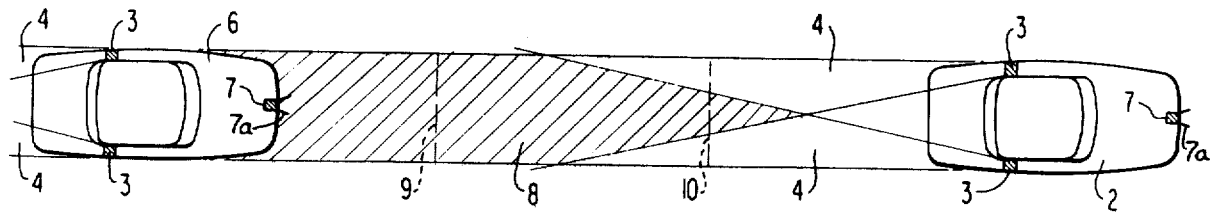
FIG. 2 is a plan view of the embodiment of FIG. 1.

Referring now to the drawing wherein like reference numerals are used throughout the various views to designate like parts, and more particularly to FIGS. 1 and 2, in the embodiment illustrated in these two figures, a vehicle 2 drives on a road 1 with a predetermined velocity. Two rearwardly radiating transmitters 3 are mounted on this vehicle 2 at roof height; this vehicle 2 also includes a forwardly directed receiver 7, i.e., a receiver 7 of conventional construction mounted at the vehicle front and which receives the signals transmitted from a preceding vehicle. The receiver includes shields 7a for ensuring that only directional beams of a vehicle travelling in the same lane can impinge on the receiver. A second vehicle 6 drives behind this vehicle 2 which is equipped with the same installations as the vehicle 2, i.e., with two transmitters 3 and a receiver 7. The two transmitters 3 of both vehicles 2 and 6 radiate each a directional beam 4 with a predetermined inclination both with respect to the road surface (FIG. 1) as also with respect to the longitudinal center plane (FIG. 2). These two beams 4 intersect in a predetermined area and form thereat an area 8 of increased radiation intensity.

If the vehicle 6 drives faster than the vehicle 2, then the receiver 7 of the vehicle 6 encounters the area of increased intensity 8 at the distance or level 9 and can trigger a warning signal or an automatic braking operation causing the vehicle brakes to be automatically actuated. Since the directional transmitters 3, the directional receivers 7 as well as the means 18 (FIG. 5) producing the warning signal which may be acoustic and/or optical and the means 19 (FIG. 5) for initiating the automatic braking operation are all of conventional construction, utilizing commercially available elements, a detailed description is dispensed with herein for the sake of simplicity.

If the vehicle 2 increases its velocity, then the angle of inclination of the directional beam of its transmitters 3 with respect to the road surface 1 is increased as shown in dash lines in FIG. 1, i.e., the directional beam of each transmitter 3 falls onto the road surface more steeply than at lower velocity 5. The change in angle of inclination is effected by a control means 20 (FIG. 5) controlling the transmitter in accordance with vehicle velocity. A now faster vehicle 6 encounters with its receiver 7 the radiant energy beam, such as the light beam or radio wave or ultrasonic beam only at the height or level 10, i.e., at a smaller distance to the preceding vehicle 2 than at a lower velocity of this vehicle 2.

Figure 3:
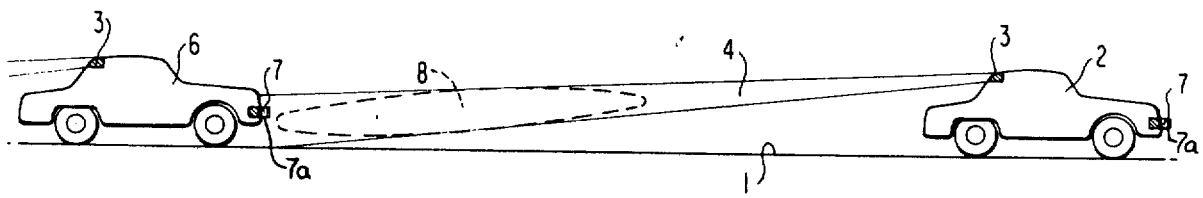
FIG. 3 is a schematic side elevational view of a modified embodiment of a distance warning installation in accordance with the present invention with two transmitters and a receiver responding to intensity change.
Figure 4:
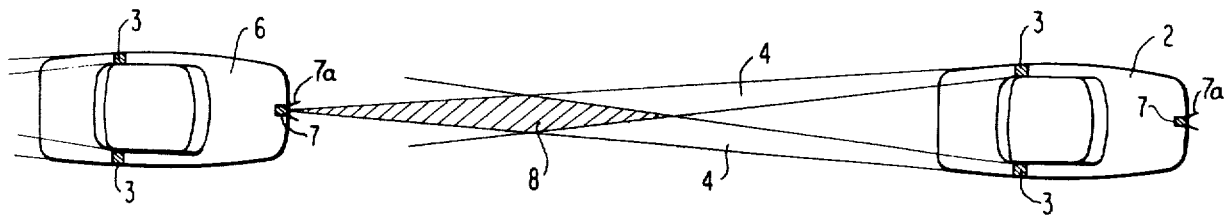
FIG. 4 is a plan view of the embodiment of FIG. 3.
Figure 6:
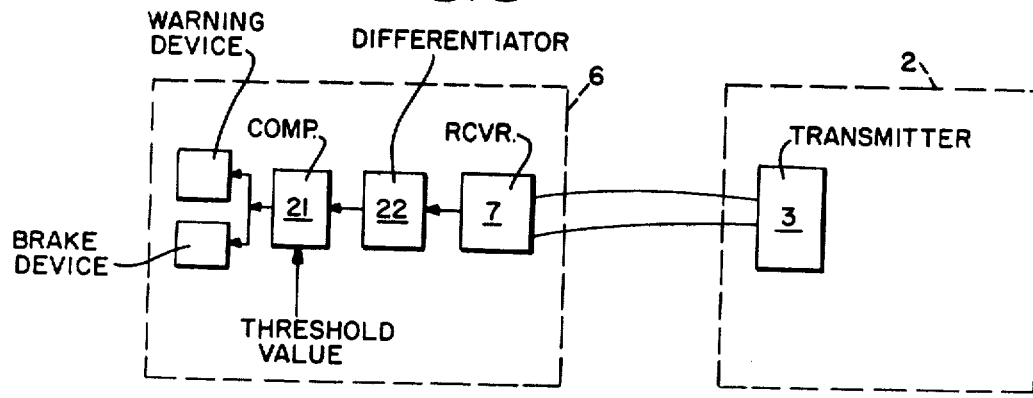
FIG. 6 is a schematic representation of another transmitter and receiver arrangement for detecting $dI/dt$.

In the second embodiment according to FIGS. 3 and 4, the receiver 7 is so constructed that it responds again by conventional means to a predetermined intensity change of the directional beam 4 of a preceding vehicle 2 which depends on the relative velocity of the second vehicle 6 to the first vehicle 2. The change in intensity may be detected as shown in FIG. 6, wherein conventional means at the receiver such as a differentiator 22 provides an output $dI/dt$.

A vehicle 2 drives with predetermined velocity on a road 1. Its two transmitters 3 mounted at roof height to the left and to the right transmit directional beams 4 at predetermined angle of inclination both with respect to the road surface 1 (FIG. 3) as also with respect to the vehicle longitudinal center plane (FIG. 4) toward the rear where they intersect or overlap in a certain area 8 and thus form an area 8 of maximum intensity at a predetermined distance from the vehicle 2. The directional beams transmitted may be modulated by the control means 20 (FIG. 5) in accordance with the vehicle velocity.

Figure 5:
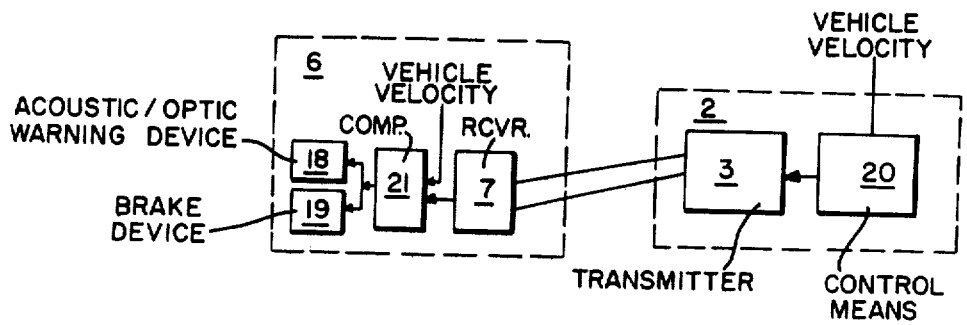
FIG. 5 is a schematic representation of a transmitter and receiver arrangement in accordance with the present invention.

If now a vehicle 6 which is equipped with the same installation drives into this area with relatively high velocity (in relation to the vehicle 2), then the receiver 7 of this vehicle 6 which responds to a predetermined intensity change, triggers a signal and/or initiates a braking operation upon exceeding an adjusted threshold value by means of a comparator 21 (FIG. 5).

Since conventional control means 20 are used for adjusting the angle of inclination of the directional beams of the transmitters 3 as a function of vehicle velocity and since also the conventional control means 20 are used to modulate the frequency and/or pulse rate of these transmitters as a function of vehicle velocity, a detailed description thereof is dispensed with herein since they form no part of the present invention.

Figure 7A:
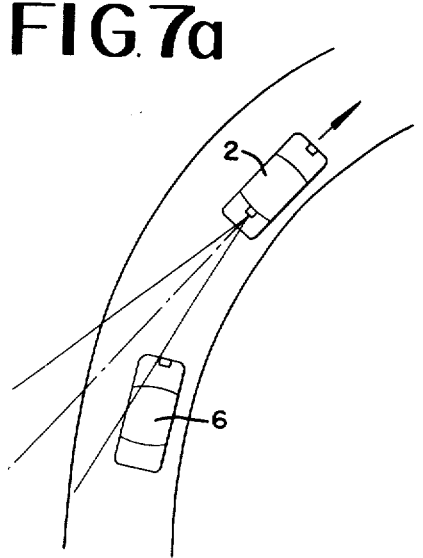
FIGS. 7a and 7b are schematic representations of the beam paths transmitted.
Figure 7B:
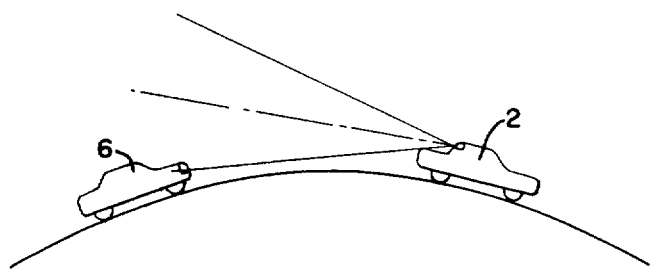

As shown in FIGS. 7a and 7b, the transmitters are so constructed that the directional beams radiated thereby expand in the directional pattern thereof in such a manner that they can be detected also in road curves up to a predetermined minimum radius of curvature and with changes in the road inclination up to a predetermined change in the angle of inclination by a receiver of a following vehicle.

While I have shown and described only several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A distance warning installation for vehicles, especially for motor vehicles, characterized in that each vehicle is equipped with two transmitter means mounted substantially at roof height to the left and right of the vehicle for transmitting radiant energy toward the rear and with a forwardly directed receiver means disposed at the front end of the vehicle for receiving the same type of radiant energy, said transmitter means radiating each a directional beam rearwardly with predetermined inclination both with respect to the plane of the road surface as well as with respect to the vehicle longitudinal center plane and thus an area of increased radiation intensity results at a predetermined distance to the rear of the vehicle which can be detected by a receiver means of a following vehicle, and in that upon impingement of the increased radiation intensity area of the directional beams transmitted by the transmitter means of a preceding vehicle on the receiver means of a following vehicle, a control signal is automatically produced by said receiver means.

2. An installation according to claim 1, characterized in that said control signal produces an acoustic warning signal.

3. An installation according to claim 1, characterized in that said control signal produces an optic signal.

4. An installation according to claim 1, with vehicle braking means, characterized in that said control signal automatically initiates a braking operation by said braking means.

5. An installation according to claim 1, characterized in that each transmitter means is so constructed that the inclination of the directional beam to the road surface is variable in dependence on the vehicle velocity so that the receiver means of a following vehicle can detect the directional beam of the preceding vehicle travelling at lower velocity at a larger distance than at a higher velocity of the preceding vehicle.

6. An installation according to claim 5, characterized in that the vehicle receiver means is so constructed that it responds to a predetermined intensity of the received directional beam.

7. An installation according to claim 5, characterized in that the vehicle receiver means is so constructed that it responds to a predetermined change of intensity $dI/dt$ corresponding to the relative oncoming velocity of the following vehicle into the radiation space of a preceding vehicle.

8. An installation according to claim 5, characterized in that each transmitter means is so constructed that for purposes of avoiding interference radiation, it transmits a directional beam with characteristic signal and that the receiver means is so constructed that it responds only to directional beams with these characteristic signals.

9. An installation according to claim 6, characterized in that each transmitter means is so constructed that it transmits a directional beam with a frequency dependent on the vehicle velocity and that the receiver means is so constructed that it compares the frequency of a received directional beam with a frequency proportional to the velocity of its own vehicle and upon determination of predetermined comparison criteria produces said control signal.

10. An installation according to claim 9, characterized in that the receiver means of each vehicle is provided with shielding means which is so constructed that only the directional beams of a vehicle travelling in the same lane can impinge on the receiver means.

11. An installation according to claim 8, characterized in that the directional beam has a constant frequency as characteristic signal.

12. An installation according to claim 8, characterized in that the directional beam has a constant pulse repetition rate as characteristic signal.

13. An installation according to claim 8, characterized in that the vehicle receiver means is so constructed that it responds to a predetermined intensity of the received directional beam.

14. An installation according to claim 8, characterized in that the vehicle receiver means is so constructed that it responds to a predetermined change of intensity $dI/dt$ corresponding to the relative oncoming velocity of the following vehicle into the radiation space of a preceding vehicle.

15. A distance warning installation for vehicles, especially for motor vehicles, characterized in that each vehicle is equipped with at least one transmitter means for transmitting a radiant energy directional beam toward the rear and with a forwardly directed receiver means disposed at the front end of the vehicle for receiving the same type of radiant energy, in that upon impingement of the directional beam transmitted by the transmitter means of a preceding vehicle on the receiver means of a following vehicle, a control signal is automatically produced by said receiver means, and in that each transmitter means is so constructed that the inclination of the directional beam to the road surface is variable in dependence on the vehicle velocity so that the receiver means of a following vehicle can detect at a larger distance the directional beam of the preceding vehicle travelling at lower velocity than a preceding vehicle travelling at a higher velocity.

16. A distance warning installation for vehicles, especially for motor vehicles, characterized in that each vehicle is equipped with at least one transmitter means for transmitting radiant energy toward the rear and with a forwardly directed receiver means disposed at the front end of the vehicle for receiving the same type of radiant energy, in that upon impingement of the directional beam transmitted by the transmitter means of a preceding vehicle on the receiver means of a following vehicle, a control signal is automatically produced by said receiver means, and in that the vehicle receiver means is so constructed that it responds to a predetermined change of intensity $dI/dt$ corresponding to the relative oncoming velocity of the following vehicle into the radiation space of a preceding vehicle.

17. A distance warning installation for vehicles, especially for motor vehicles, characterized in that each vehicle is equipped with at least one transmitter means for transmitting a radiant energy directional beam toward the rear and with a forwardly directed receiver means disposed at the front end of the vehicle for receiving the same type of radiant energy, in that upon impingement of the directional beam transmitted by the transmitter means of a preceding vehicle on the receiver means of a following vehicle, a control signal is automatically produced by said receiver means, in that each transmitter means is so constructed that it transmits a directional beam with a frequency dependent on the vehicle velocity and that the receiver means is so constructed that it compares the frequency of a received directional beam with a frequency proportional to the velocity of its own vehicle and upon determination of predetermined comparison criteria produces said control signal, each vehicle being equipped with two transmitter means mounted substantially at roof height to the left and right of the vehicle, said transmitter means radiating each a directional beam rearwardly with predetermined inclination both with respect to the plane of the road surface as well as with respect to the vehicle longitudinal center plane and thus an area of increased radiation intensity results at a predetermined distance to the rear of the vehicle which can be detected by a receiver means of a following vehicle.

* * * * *